(12) United States Patent
Son et al.

(10) Patent No.: US 10,742,355 B2
(45) Date of Patent: Aug. 11, 2020

(54) APPARATUS THAT RECEIVES NON-BINARY POLAR CODE AND DECODING METHOD THEREOF

(71) Applicant: SAMSUNG ELECTRONICS CO., LTD., Suwon-si, Gyeonggi-Do (KR)

(72) Inventors: Jae-Yong Son, Hwaseong-si (KR); Chang-Kyu Seol, Osan-si (KR); Hong-Rak Son, Anyang-si (KR); Pil-Sang Yoon, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/566,246

(22) Filed: Sep. 10, 2019

(65) Prior Publication Data
US 2020/0220652 A1   Jul. 9, 2020

(30) Foreign Application Priority Data

Jan. 3, 2019   (KR) .................. 10-2019-0000853

(51) Int. Cl.
*H04L 1/00* (2006.01)

(52) U.S. Cl.
CPC .......... *H04L 1/0052* (2013.01); *H04L 1/0054* (2013.01); *H04L 1/0057* (2013.01)

(58) Field of Classification Search
CPC .. G06F 11/073; G06F 11/1482; H04L 1/0069; H04L 1/0013; H04L 1/0041; H04L 1/0052; H04L 1/0054; H04L 1/0057
See application file for complete search history.

(56) References Cited

U.S. PATENT DOCUMENTS 7,278,082 B2   10/2007  Kim et al.
8,140,930 B1    3/2012  Maru
                        (Continued)

FOREIGN PATENT DOCUMENTS

JP   2006235389   9/2006
JP   2007124341   5/2007
JP   2013070133   4/2013

OTHER PUBLICATIONS

R. Mori and T. Tanaka, "Channel polarization on q-ary discrete memoryless channels by arbitrary kernels," in Proc. IEEE ISIT 2010.
(Continued)

*Primary Examiner* — Janice N Tieu
(74) *Attorney, Agent, or Firm* — Volentine, Whitt & Francos, PLLC

(57) ABSTRACT

An apparatus that receives a non-binary polar code through a channel includes a low-complexity decoder and a memory. The low-complexity decoder is configured to selectively calculate first common terms for input symbols in the non-binary polar code other than a first input symbol corresponding to a first target output symbol. The selective calculation uses a lower triangular kernel and log likelihood ratios of the input symbols generated based on a channel characteristic of the channel. The low-complexity decoder is also configured to calculate log likelihood ratios of the first target output symbol using the first common terms and to determine a value of the first target output symbol based on the log likelihood ratios of the first target output symbol. The memory is accessible by the low-complexity decoder and is configured to store the first common terms.

20 Claims, 10 Drawing Sheets

(56) References Cited

U.S. PATENT DOCUMENTS

| | | | |
|---|---|---|---|
| 8,576,958 B2 | 11/2013 | Gotman et al. | |
| 9,176,927 B2 | 11/2015 | Gross et al. | |
| 2016/0056843 A1 | 2/2016 | Gross et al. | |
| 2017/0364399 A1* | 12/2017 | Shi | H03M 13/618 |
| 2017/0366204 A1* | 12/2017 | Shi | H04L 25/061 |
| 2017/0366205 A1* | 12/2017 | Zhang | H04L 1/0057 |
| 2018/0097580 A1* | 4/2018 | Zhang | H03M 13/13 |
| 2018/0192402 A1* | 7/2018 | Shelby | H04L 25/03866 |
| 2019/0379486 A1* | 12/2019 | Hwang | H04L 1/0057 |

OTHER PUBLICATIONS

R. Mori et al., "Non-binary polar codes using Reed-Solomon codes and algebraic geometry codes," Jul. 21, 2010.
Nan Cheng et al., "Encoder and List Decoder of Reed-Solomon Kernel Based Polar Codes," 2016 IEEE.
Satish Babu Korada et al., "Polar Codes: Characterization of Exponent, Bounds, and Constructions," IEEE Transactions on Information Theory, Vo., No. 56, No. 12, Dec. 2010, pp. 6253-6264.

* cited by examiner

FIG. 5A $$G_{KN}$$

$$u \leftarrow \begin{bmatrix} 1 & 1 & 1 & 0 \\ \alpha & \alpha^2 & 1 & 0 \\ \alpha^2 & \alpha & 1 & 0 \\ 1 & 1 & 1 & \alpha \end{bmatrix} \leftarrow x$$

$u_0\, u_1\, u_2\, u_3 \qquad x_0\, x_1\, x_2\, x_3$

Case_1: $u = [\,0\ \underline{0\ 1\ 1}\,] \leftrightarrow x\,[\,\alpha\ \underline{\alpha^2\ 0\ \alpha}\,]$ Case_2: $u = [\,1\ \underline{0\ 1\ 1}\,] \leftrightarrow x\,[\,\alpha^2\ \underline{\alpha\ 1\ \alpha}\,]$ Case_3: $u = [\,\alpha\ \underline{0\ 1\ 1}\,] \leftrightarrow x\,[\,0\ \underline{1\ \alpha\ \alpha}\,]$ Case_4: $u = [\,\alpha^2\ \underline{0\ 1\ 1}\,] \leftrightarrow x\,[\,1\ \underline{0\ \alpha^2\, \alpha}\,]$

FIG. 5B $$G_{LTKN}$$

$$u \leftarrow \begin{bmatrix} 1 & 0 & 0 & 0 \\ 1 & 1 & 0 & 0 \\ \alpha^2 & \alpha & 1 & 0 \\ 1 & 1 & 1 & \alpha \end{bmatrix} \leftarrow x$$

$u_0\, u_1\, u_2\, u_3 \qquad x_0\, x_1\, x_2\, x_3$

Case_1: $u = [\,0\ \underline{0\ 1\ 1}\,] \leftrightarrow x\,[\,\alpha\ \underline{\alpha^2\ 0\ \alpha}\,]$ Case_2: $u = [\,1\ \underline{0\ 1\ 1}\,] \leftrightarrow x\,[\,\alpha^2\ \underline{\alpha^2\ 0\ \alpha}\,]$ Case_3: $u = [\,\alpha\ \underline{0\ 1\ 1}\,] \leftrightarrow x\,[\,0\ \underline{\alpha^2\ 0\ \alpha}\,]$ Case_4: $u = [\,\alpha^2\ \underline{0\ 1\ 1}\,] \leftrightarrow x\,[\,1\ \underline{\alpha^2\ 0\ \alpha}\,]$

TB1

| TARGET OUTPUT SYMBOL | LLR OF INPUT SYMBOL | COMMON TERM |
|---|---|---|
| $u_0$ | $\lambda_0^{(b)}$ (b = 0, 1, α, α²) | A |
|  | $\lambda_0^{(b+1)}$ | B |
|  | $\lambda_0^{(b+\alpha)}$ | C |
|  | $\lambda_0^{(b+\alpha^2)}$ | D |
| $u_1$ | $\lambda_1^{(b)}$ | A' |
|  | $\lambda_1^{(b+1)}$ | B' |
|  | $\lambda_1^{(b+\alpha)}$ | C' |
|  | $\lambda_1^{(b+\alpha^2)}$ | D' |

| TARGET OUTPUT SYMBOL | FIRST LLR OF INPUT SYMBOL | SECOND LLR OF INPUT SYMBOL | COMMON TERM |
|---|---|---|---|
| $u_0$ | $\lambda_0^{(b)}$ (b = 0, 1, α, α²) | $\lambda_1^{(b)}$ | $A_0$ |
| | | $\lambda_1^{(b+1)}$ | $A_1$ |
| | | $\lambda_1^{(b+\alpha)}$ | $A_2$ |
| | $\lambda_0^{(b+1)}$ | $\lambda_1^{(b+\alpha^2)}$ | $A_3$ |
| | | $\lambda_1^{(0)}$ | $B_0$ |
| | | $\lambda_1^{(1)}$ | $B_1$ |
| | | $\lambda_1^{(\alpha)}$ | $B_2$ |
| | | $\lambda_1^{(\alpha^2)}$ | $B_3$ |

...

APPARATUS THAT RECEIVES NON-BINARY POLAR CODE AND DECODING METHOD THEREOF

CROSS-REFERENCE TO RELATED APPLICATION

This U.S. non-provisional patent application claims the benefit of priority under 35 U.S.C. § 119 to Korean Patent Application No. 10-2019-0000853, filed on Jan. 3, 2019 in the Korean Intellectual Property Office, the disclosure of which is incorporated herein in its entirety by reference.

BACKGROUND

1. Technical Field

The present disclosure relates to a device for receiving and processing non-binary polar codes. More particularly, the present disclosure relates to a decoding method for the device that receives and processes non-binary polar codes.

2. Discussion of Related Art

A polar code is a linear block error correcting code. The polarity refers to the reliability which is either high or low of/for virtual outer channels which are the transformational result of multiple recursive concantenations of a kernel code. A non-binary polar code refers to a polar code in which more than two input values are possible, so not just 0 and 1 for example. A polar code is used as an error correction code (ECC) itself, but also is applicable to various memory signal processing techniques. In particular, a successive cancellation decoding technique using a non-binary polar code based on a logarithmic code has a correction capability comparable to a continuous removal list decoding technique using binary polar codes and has an improved decoding throughput at the same time. However, as the odd number of non-binary polar codes increases, the computational complexity in decoding may increase exponentially. Accordingly, in order to efficiently decode the non-binary polar code, selective reduction of the computational complexity should be considered as described herein.

SUMMARY

According to an aspect of the present disclosure, an apparatus efficiently performs a decoding operation without degrading decoding performance. A decoding method for the apparatus that efficiently performs the decoding operation effectively reduces the complexity of various operations included in the decoding operation when a decoding operation is performed using a non-binary polar code.

According to an aspect of the present disclosure, an apparatus receives a non-binary polar code through a channel. The apparatus includes a low-complexity decoder and a memory. The low-complexity decoder is configured to implement a process that includes selectively calculating, for input symbols in the non-binary polar code other than a first input symbol corresponding to a first target output symbol, first common terms using a lower triangular kernel and log likelihood ratios of the input symbols generated based on a channel characteristic of the channel. The process implemented by the low-complexity decoder also includes calculating log likelihood ratios of the first target output symbol using the first common terms and determining a value of the first target output symbol based on the log likelihood ratios of the first target output symbol. The memory is accessible by the low-complexity decoder and is configured to store the first common terms as stored first common terms.

According to another aspect of the present disclosure, an apparatus receives a non-binary polar code through a channel. A decoding method of the apparatus includes generating, based on a channel characteristic of the channel, log likelihood ratios of input symbols in the non-binary polar code other than a first input symbol corresponding to a first target output symbol. The decoding method also includes selectively calculating, for the input symbols in the non-binary polar code other than the first input symbol, first common terms using a lower triangular kernel. The decoding method further includes calculating log likelihood ratios of the first target output symbol using the first common terms and determining a value of the first target output symbol based on the log likelihood ratios of the first target output symbol.

According to another aspect of the present disclosure, an apparatus receives a non-binary polar code through a channel. A decoding method of the apparatus includes generating log likelihood ratios of input symbols in the non-binary polar code based on a channel characteristic of the channel. The decoding method also includes selectively calculating a first input symbol corresponding to a first target output symbol. The decoding method further includes selectively calculating, for input symbols other than the first input symbol and a second input symbol corresponding to a second target output symbol to be decoded subsequent to the first target output symbol, common terms using a lower triangular kernel. The decoding method further includes calculating log likelihood ratios of the first target output symbol using the common terms and determining a value of the target output symbol based on the log likelihood ratios of the first target output symbol. The decoding method may be continuously calculated until the log likelihood ratios of the last output symbol is calculated.

BRIEF DESCRIPTION OF THE DRAWINGS

Embodiments of the present disclosure will be more clearly understood from the following detailed description taken in conjunction with the accompanying diagrams in which:

FIG. 5A is a diagram for explaining a first kernel, and FIG. 5B is a diagram for explaining a lower triangular kernel;

FIG. 8B is a table for explaining the common terms generated by the decoding method explained using the diagram of FIG. 8A;

DETAILED DESCRIPTION OF THE EMBODIMENTS

In the various embodiments of the present disclosure described below, a hardware approach is illustrated by way of example. However, since various embodiments of the present disclosure include techniques that use both hardware and software, the various embodiments of the present disclosure do not exclude a software-based approach which is still implemented using hardware such as a processor that executes the software.

In addition, the present disclosure will describe an apparatus and method for decoding polar codes containing information bits. However, the terms that are used hereinafter are illustrative for convenience of description, so that the present disclosure is not restricted to the terms used to describe the inventive concept(s) of the present disclosure, and the scope of the present disclosure extends to equivalent technical means and mechanisms.

Hereinafter, embodiments of the present disclosure will be described in detail with reference to the accompanying diagrams.

Figure 1:
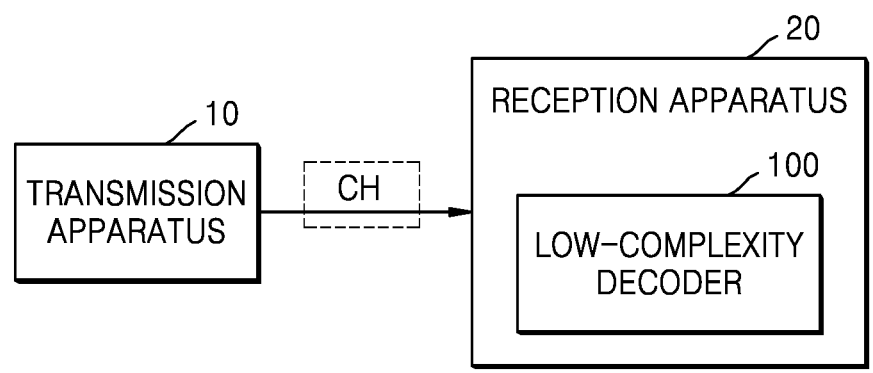
FIG. 1 is a schematic block illustrating a data transmission and reception system according to an embodiment of the present disclosure.

FIG. 1 is a schematic block illustrating a data transmission and reception system 1 according to an embodiment of the present disclosure.

Referring to FIG. 1, a data transmission and reception system 1 may include a transmission apparatus 10 and a reception apparatus 20. A data transmission and reception system 1 according to an embodiment of the present disclosure may be applied to various systems including two or more devices each transmitting and receiving data through a channel CH. For example, when the data transmission and reception system 1 is a wireless communication system, the transmission apparatus 10 and the reception apparatus 20 may correspond to a terminal or a base station, respectively, and a channel CH is required for wireless communication and may mean a data transmission area (e.g., spectrum) having a sufficient bandwidth. In addition, when the data transmission and reception system 1 is a computing system, the transmission apparatus 10 and the reception apparatus 20 may correspond to a host and a memory controller (or a memory system including a memory controller) respectively, and a channel CH may refer to a data transmission line (e.g., a data bus) connected between the transmission apparatus 10 and the reception apparatus 20.

The transmission apparatus 10 may use various encoding techniques to improve performance with respect to an error rate of data that is transmitted through the channel CH. In an embodiment, the transmission apparatus 10 may perform encoding based on a non-binary polar code and may convert the data into a non-binary polar code to transmit the converted non-binary polar code to the reception apparatus 20 through the channel CH. The reception apparatus 20 according to an embodiment of the present disclosure may include a low-complexity decoder 100. The low-complexity decoder 100 may minimize the computational complexity of the non-binary polar codes received through the channel CH, thereby performing efficient decoding. To be clear from the very outset, decoding as described herein is not simply a matter of translation, and instead may involve estimations as a trade-off with reducing a workload such as an amount of processing. This, in turn, improves processing speeds, reduces latency resultant from processing by elements such as the low-complexity decoder 100, and ultimately improves the capabilities of a communications device and/or a computer device that provides results based on decoded data. The improvements may be enhanced when aspects of the decoding are performed in advance, such as by calculating and storing probabilities that a input symbol or output symbol with have a particular value when a related input symbol or output symbol has a predetermined value. The processing performed in advance may be performed systematically so as to calculate and store probabilities for an entire range of possibilities for each different possible predetermined value. Specifically, the low-complexity decoder 100 may implement (e.g., execute or cause to be executed) a process to perform decoding on non-binary polar codes using a successive cancellation decoding algorithm. According to the successive cancellation decoding algorithm, the low-complexity decoder 100 may implement the process to perform sequential decoding on output symbols using a kernel and input symbols constituting polar codes to output the output symbols whose values are determined as a decoding result. The output symbols may correspond to the information bits transmitted by the transmission apparatus 10. The reception apparatus 20 may perform a data processing operation (e.g., error correction, memory, signal processing, etc.) subsequent to decoding using output symbols output as a decoding result.

The low-complexity decoder 100 according to an embodiment of the present disclosure may modify a first kernel to decode the polar code and may decode the polar code using the modified kernel. The modified kernel may be referred to as a lower triangular kernel. The first kernel is a basic unit forming the polar code generation matrix to be used when the transmission apparatus 10 encodes predetermined information bits into polar codes. Information on this first kernel may be received by the reception apparatus 20 in advance to recognize the polar code when the polar code is received. The output symbols from the transmission apparatus may be included in a non-binary u vector having a size of 1×N (where N is an integer equal to or greater than 1), and the input symbols may be included in a 1×N non-binary x vector. Each of the u vector and the x vector may include N components. The relationship between the u vector and the x vector may be expressed by Equation 1 below, and the low-complexity decoder 100 may implement the process to perform decoding using this relationship.

$$uG_N = x \qquad \text{[Equation 1]}$$

In Equation 1, $G_N$ means a polar code generation matrix of N×N size, $G_N$ may be formed by a Kronecker product of a lower triangular kernel, so that output symbols included in the u vector and the input symbols included in the x vector may correspond to each other based on $G_N$. The contents related to the lower triangular kernel will be described in detail in FIGS. 2, 5A and 5B.

The low-complexity decoder 100 may generate log likelihood ratios (LLRs) for each of the input symbols included in the non-binary polar code based on the channel characteristic(s) of the channel CH. As described herein, a log likelihood ratio (LLR) is a ratio that indicates the probability of a symbol (e.g., an input symbol or an output symbol) having a particular value such as '0' or '1'. The low-complexity decoder 100 may calculate the LLRs corresponding to values which each of the output symbols may have using the LLRs of the lower triangular kernel and input symbols. Before proceeding, several terms used herein will be described by way of explanation and example. In this regard, a group of "remaining" input symbols may be the input symbols of a non-binary polar code that remain after a first input symbol and/or a second input symbol of the non-binary polar code are selectively excluded from consideration. The remaining input symbols excluding the first input symbol and/or the second input symbol may be referred to as a "combination" of input symbols, and directly or indirectly refers to patterns of values that the remaining input symbols may have. The LRRs of input symbols in one or more such combinations may be referred to as a "common term" insofar as a term which includes the LRRs of a group references in common the LRRs of the members of the group.

The low-complexity decoder 100 may sequentially determine values of output symbols through decoding. An output symbol corresponding to a value to be determined by the low-complexity decoder 100 may be defined as a target output symbol, and the value to be determined may be referred to herein as a determined value, such as a determined value of a target output symbol or determined values of target output symbols. In an embodiment, the low-complexity decoder 100 may selectively calculate common terms for all but one or two input symbols which correspond to target output symbols. In the event that common terms are selectively calculated for all but one input symbols which correspond to target output symbols, the one input symbol may be referred to herein as a first input symbol corresponding to a first target output symbol. In the event that common terms are selectively calculated for all but two input symbols which correspond to target output symbols, the two input symbols may be referred to herein as a first input symbol corresponding to a first target output symbol and as a second input symbol corresponding to a second target output symbol. The exception of the one or two input symbols from consideration in the selective calculation may be based on timing considerations, in which case the exception may be phrased as, e.g., "after" a first input symbol or "after" a second input symbol. The exception of the one or two input symbols from consideration in the selective calculation may also be based on placement considerations, in which case the exception may also be phrased as, e.g., "after" a first input symbol or "after" a second input symbol. Additionally, or alternatively, the exception of the one or two input symbols from consideration in the selective calculation may be based simply on grouping of input symbols in a non-binary polar code, in which case the exception may be phrased as, e.g., "except for" a first input symbol or "except for" a second input symbol. The selective computation of common terms for all but one or two input symbols may therefore be for remaining input symbols after the input symbols (except for the input symbols) corresponding to the target output symbols. That is, the low-complexity decoder 100 may calculate the common terms for the input symbols that remain after the input symbols corresponding to the target output symbols are excepted.

The low-complexity decoder 100 may selectively compute the common terms using the LLRs of the input symbols and the lower triangular kernel. In an embodiment, the target output symbol has a value, and the common terms may include a sum of values obtained by using the LLRs of the input symbols based on combinations of the remaining input symbols. The combinations of the remaining input symbols may mean patterns composed of values that the remaining input symbols may have. The contents of the common terms will be described in detail in FIGS. 7A and 7B. Afterwards, the low-complexity decoder 100 may compute the LLRs of the target output symbol using the common terms and may determine the value of the target output symbol based on the LLRs of the target output symbol. The low-complexity decoder 100 may implement the process to perform decoding to determine a value for the next target output symbol when the value of the target output symbol is determined.

The low-complexity decoder 100 according to an embodiment of the present disclosure may pre-compute the common terms for the target output symbol before the decoding is performed. As a result, when the decoding is performed, the low-complexity decoder 100 may omit the process of iteratively computing all combinations of input symbols by easily using pre-computed common terms each time they are needed during an arithmetic operation to generate the LLRs of the target output symbol. This in turn reduces the computational complexity of decoding, which may result in faster processing results such as faster audio and/or visual output and so on. This may help in meeting requirements for newer standards that use or may be met by using non-binary polar codes for example. As a result, the reception apparatus 20 may efficiently perform decoding without degradation of decoding performance for non-binary polar codes.

Figure 2:
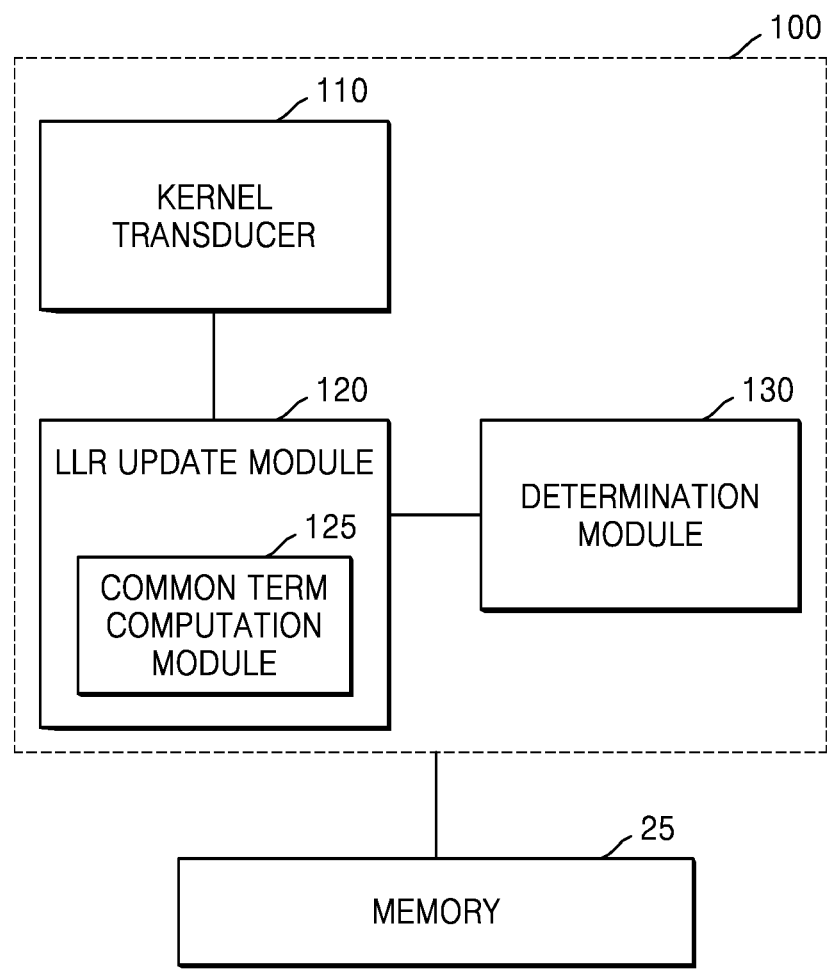
FIG. 2 is a block diagram illustrating a low-complexity decoder according to an embodiment of the present disclosure.

Before proceeding, it should be clear that FIGs. herein including FIG. 1 and FIG. 2 show and reference devices and circuitry with labels such as "apparatus", "decoder", "module", "transducer", "controller" and/or "unit". Such circuitry may include a processor including a microprocessor or application specific integrated circuit (ASIC) and other elements with other labels. As is traditional in the field of the inventive concept(s) described herein, examples may be described and illustrated in terms of blocks such as circuits and other elements which carry out a described function or functions. These blocks, which may be referred to herein as apparatus, decoder, module, transducer, controller and/or unit or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the examples may be physically separated into two or more interacting and discrete blocks without departing from the scope of the present disclosure. Likewise, the blocks of the examples may be physically combined into more complex blocks without departing from the scope of the present disclosure.

FIG. 2 is a block diagram illustrating a low-complexity decoder 100 according to an embodiment of the present disclosure.

Referring to FIG. 2, the low-complexity decoder 100 may include a kernel transducer 110, an LLR update module 120, and a determination module 130. Hereinafter, blocks included in the low-complexity decoder 100 may be implemented as hardware blocks, software blocks, and hardware/software combined blocks, respectively. Furthermore, the low-complexity decoder 100 as a hardware logic circuit may directly receive a non-binary polar code and may perform decoding of the non-binary polar code to output the decoding result. Alternatively, the low-complexity decoder 100 may store the non-binary polar code in a memory 25 in the form of a command code and the low-complexity decoding may be implemented with a logic circuit of/as the low-complexity decoder 100 that may perform a function by being executed by a processor. That is, the implementation of the low-complexity decoder 100 that precalculates the common terms in advance to lower the decoding operation complexity of the non-binary polar code may vary and is not limited to a particular implementation.

The kernel transducer 110 may perform a Gaussian elimination for the first kernel used to generate the polar code to generate the lower triangular kernel from the first kernel. The off-diagonal terms of the lower triangular kernel generated through Gaussian elimination may include primitive elements and the exponent value of the lower triangular may satisfy the same condition as the exponent value of the first kernel.

As an example, the kernel transducer 110 may be configured such that the off-diagonal terms of the lower triangular kernel are composed of primitives, based on reference 1 which is R. Mori and T. Tanaka, "Channel polarization on q-ary discrete memoryless channels by arbitrary kernels," in Proc. IEEE NIT 2010, the teachings of which are incorporated by reference herein. Through the above example, the lower triangular kernel may be polarizable.

As an example, the kernel transducer 110 may calculate a first partial distance of the lower triangular kernel to calculate the exponent value of the lower triangular kernel from the first partial distance and may calculate a second partial distance of the first kernel to calculate the exponent value of the first kernel from the second partial distance, based on reference 2 which is S. B. Korada, E. Sasoglu, and R. Urbanke, "Polar codes: characterization of exponent, bounds, and constructions," IEEE Trans. Inform. Theory, vol. 56, no. 12, Dec. 2010, the teachings of which are incorporated by reference herein. The kernel transducer 110 may confirm whether an exponent value of the lower triangular kernel is the same as an exponent value of the first kernel to complete the generation of the lower triangular kernel when the confirmed exponent values are the same as each other.

The LLR update module 120 may generate the LLRs of the input symbols included in the non-binary polar code based on the channel characteristic(s) of the channel between the transmission apparatus and the reception apparatus. The LLR update module 120 may generate the LLRs of the output symbols using the LLRs of the lower triangular kernel and input symbols. An operation of generating LLRs of output symbols may be defined as an LLR update operation.

In an embodiment, the LLR update module 120 may include a common term computing module 125, and the common term computing module 125 may selectively calculate the common terms for the remaining input symbols other than the input symbols corresponding to the target output. The common term computing module 125 may selectively calculate the common terms using the LLRs of the input symbols and the lower triangular kernel. Specifically, the common term computing module 125 may generate combinations of the remaining input symbols according to values of the input symbol corresponding to the target output symbol when the target output symbol has a value. The LLRs of the input symbols may be generated based on the channel characteristic(s) of the channel. The common term computing module 125 may generate common terms by computing the LLRs for the combinations of the remaining input symbols using the LLRs of the input symbols. For example, during the decoding of a 4-ary polar code, since each input symbol may have four values, the common term computing module 125 may calculate the LLRs for the combinations of the remaining input symbols according to each of the four values of the input symbol corresponding to the target output symbol to generate four common terms. This will be described in detail in FIG. 7B.

In another embodiment, the common term computing module 125 may selectively calculate the common terms for the remaining input symbols other than the input symbol corresponding to the target output symbol and at least one additional input symbol. The additional input symbol may be an input symbol corresponding to the next target output symbol.

Specifically, when the target output symbol has a value (e.g., a first value) and the input symbol corresponding to the target output symbol has a value (e.g., a first value), the common term computing module 125 may generate combinations of the remaining input symbols according to the values of the additional input symbol. The LLRs of the input symbols may be generated based on the channel characteristic(s) of the channel. The common term computing module 125 may calculate the LLRs for the combinations of the remaining input symbols using the LLRs of the input symbols to generate common terms. In this manner, when the target output symbol has a value (e.g., a first value) and the input symbol corresponding to the target output symbol has another value (e.g., a second value), the common term computing module 125 may generate other common terms in the manner described above. The details of this will be described in detail in FIGS. 8A and 8B. The common term computing module 125 may store the generated common terms in the memory 25. The common term computing module 125 may variably adjust the number of additional input symbols in consideration of the performance or operating environment of the reception apparatus 20 in FIG. 1. For example, when the performance or operating environment of the reception apparatus 20 in FIG. 1 is considered, the common term computing module 125 may adjust the number of additional input symbols to be increased when complicated calculations are quick or when low latency is not required because an operation logic of the reception apparatus is simple. In addition, when the performance or operating environment of the reception apparatus 20 in FIG. 1 is considered, the common term computing module 125 may adjust the number of additional input symbols to be decreased when an operation logic performs complicated calculations quickly due to complex computation logic, or when low latency is required.

The LLR update module 120 may read the common terms stored in the memory 25 and may use the common terms in an arithmetic operation to generate the LLRs of the target output symbols. Specifically, the LLRs of the input symbols may be generated based on the channel characteristic(s) of the channel. The LLR update module 120 may obtain the LLRs of the input symbols corresponding to the target output symbols according to the values that the target output symbols may have from the LLRs of the input symbols. Thereafter, the LLR update module 120 may generate the LLRs of the target output symbol by summing a component of each of the LLRs of the acquired input symbols and a component corresponding to each of the common terms.

The LLR update module 120 may generate the LLRs of the target output symbols to provide the generated LLRs to the determination module 130. The determination module 130 may determine a value corresponding to the LLR with the largest value (i.e., having the largest value) among the LLRs of the target output symbol as a value of the target output symbol. Afterwards, the LLR update module 120 may generate the LLRs of the next target output symbol in the manner described above.

The low-complexity decoder 100 may complete the decoding by determining the values of all the target output symbols and may provide the decoded result value to a block that performs data processing, such as a processor, an application processor (AP), a system on chip (SoC), and a modem in the reception apparatus 20.

In an embodiment, the memory 25 may store the common terms generated by the common term computing module 125 and may reserve a memory space for storing the other common terms by deleting the common terms after the LLRs of the target output symbols corresponding to the common terms are generated.

Figure 3:
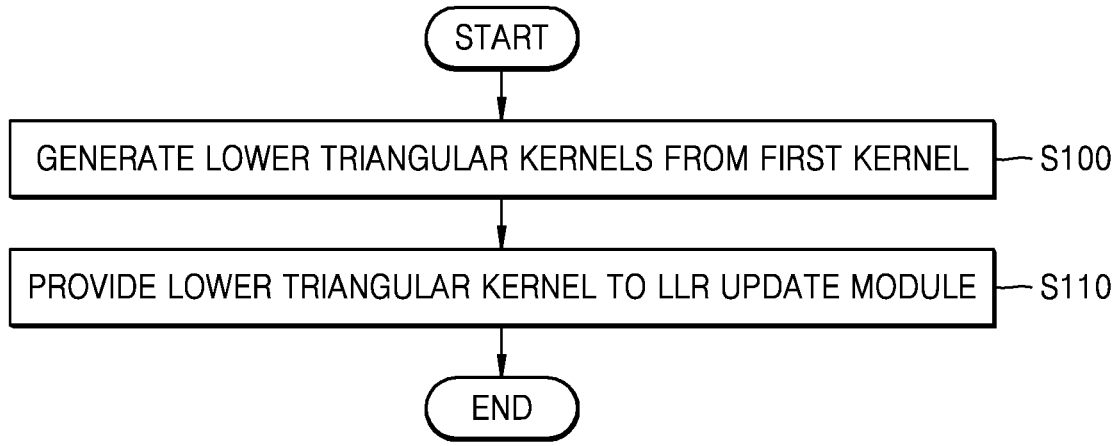
FIG. 3 is a flowchart for explaining an operation of a kernel transducer of FIG. 2.
Figure 4:
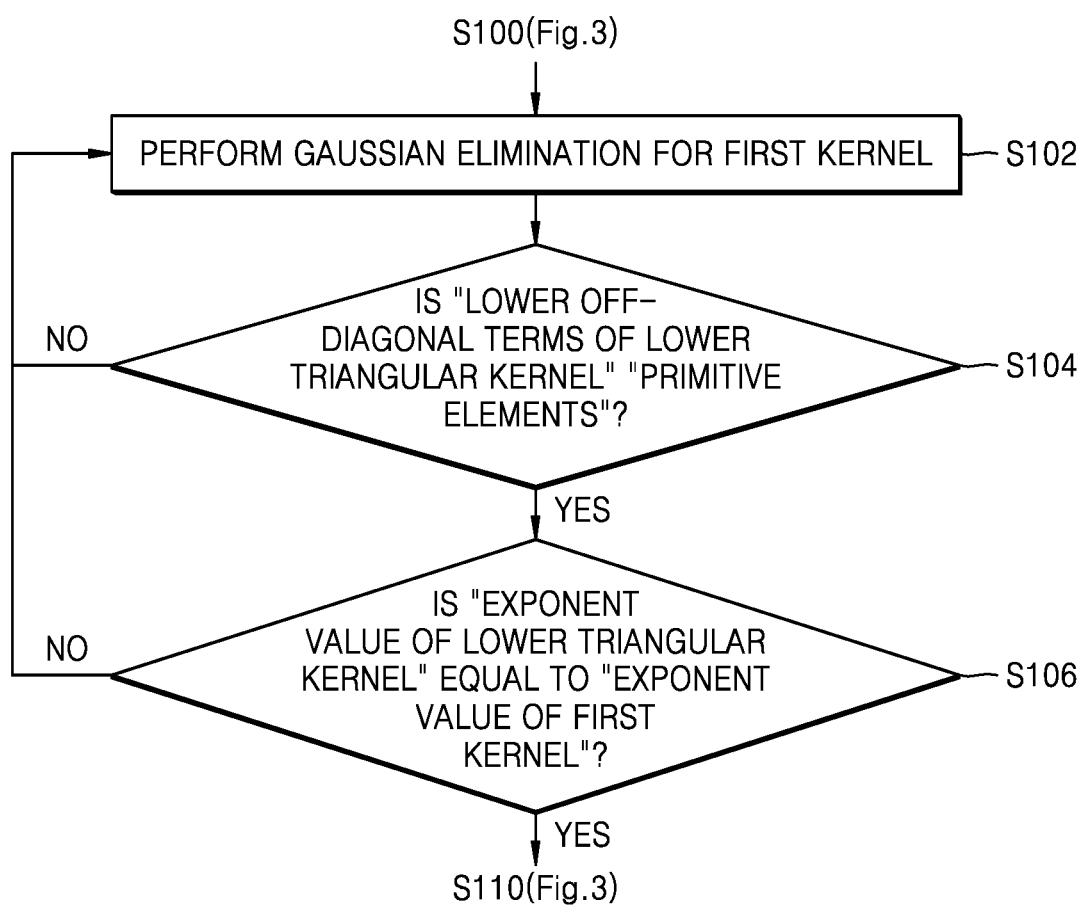
FIG. 4 is a flowchart for explaining context for step S110 of FIG. 3.

FIG. 3 is a flowchart for explaining an operation of the kernel transducer 110 of FIG. 2, and FIG. 4 is a flowchart for explaining context for step S110 of FIG. 3. Hereinafter, for the sake of understanding, description will be made with reference to FIG. 2.

Referring to FIG. 3, in S100, the kernel transducer 110 may generate a lower triangular kernel from the first kernel. The first kernel may be a basic unit forming a polar code generation matrix used to generate the non-binary polar code. The kernel transducer 110 may generate a lower triangle kernel that reduces the computational complexity at the time of decoding by modifying the previously stored first kernel. In S110, the kernel transducer 110 may provide the lower triangular kernel to the LLR update module 120. The LLRs of the input symbols in the non-binary polar code may be generated based on the lower triangular kernel and the channel characteristic(s) of the channel. The LLR update module 120 may perform decoding using the LLRs of the input symbols.

In S102, referring to FIG. 4, the kernel transducer 110 may perform Gaussian elimination for the first kernel. In S104, the kernel transducer 110 may perform Gaussian elimination to determine whether the terms below the diagonal (i.e., off-diagonal terms) of the lower triangular kernel are primitive elements. In S106, the kernel transducer 110 may determine whether the exponent value of the lower triangular kernel is equal to the exponent value of the first kernel when the off-diagonal terms of the lower triangular kernel are composed of primitive elements (S104=YES). When the exponent value of the lower triangular kernel is equal to the exponent value of the first kernel (S106=YES), the kernel transducer 110 may perform Step S110. In addition, when the terms below the diagonal (i.e., off-diagonal terms) of the lower triangle kernel are not composed of primitive elements (S104=NO), or when the exponent value of the lower triangle kernel is not equal to the exponent value of the first kernel (S106=NO), the kernel transducer 110 may return to step S102 to re-execute the Gaussian elimination for the first kernel so as to satisfy the condition of the lower triangle kernel. In FIG. 4, steps S104 and S106 are illustrated to be performed sequentially, but the Gaussian elimination at S104 and the determination at S106 are not limited thereto and may instead be performed simultaneously with step S102.

FIG. 5A is a diagram for explaining the first kernel $G_{KN}$, and FIG. 5B is a diagram for explaining the lower triangular kernel $G_{LTKN}$.

Hereinafter, it is assumed that the non-binary polar code is a 4-ary polar code, but since this is merely an example for convenience of explanation, and the teachings of the present disclosure may be applied to decoding for polar codes with higher radix. The u vector may have a magnitude of 1×4 and may include four output symbols $u_0$ to $u_3$, the x vector may have a magnitude of 1×4 and may include four input symbols $x_0$ to $x_3$. The first kernel $G_1$ and the lower triangular kernel $G_{LTKN}$ may be a basic unit of a polar code generation matrix having a size of 4×4, and may satisfy Equation 1 described in FIG. 1. The output symbols $u_0$ to $u_3$ and the input symbols $x_0$ to $x_3$ may have values of '0', '1', '$\alpha$', '$\alpha^2$', respectively.

Referring to FIG. 5A, on the first kernel $G_{KN}$, the x-vector is [$\alpha$ $\alpha^2$ 0 $\alpha$] when the u-vector is [0 0 1 1] in the first case Case_1, the x vector is [$\alpha^2$ $\alpha$ 1 $\alpha$] when the u vector is [1 0 1 1] in the second case Case 2, the x vector is [$\alpha^2$ $\alpha$ 1 $\alpha$] when the u vector is [0 1 $\alpha$ $\alpha$] in the third case Case 3, and the x vector is [1 0 $\alpha^2$ $\alpha$] when the u vector is [$\alpha^2$ 0 1 1] in the fourth case Case 4, the x vector is [1 0 $\alpha^2$ $\alpha$]. As described above, in the first to fourth cases Case_1 to Case_4, even though the values of the second to fourth output symbols (excluding the first output symbol $u_0$) in the relationship between the x vector and the u vector by the first kernel $G_{KN}$ are the same, it may be seen that the patterns of the values of the second through fourth input symbols $x_1$ to $x_3$ of the x vector are different for each of the cases Case_1 to Case_4. As a result, decoding of non-binary polar codes using the first kernel $G_{KN}$ may have a problem of high computational complexity.

Referring to FIG. 5B, on the lower triangular kernel $G_{LTKN}$, the x vector is [$\alpha$ $\alpha^2$ 0 $\alpha$] when the u vector is [0 0 1 1] in the first case Case_1, the x vector is [$\alpha^2$ $\alpha^2$ 0 $\alpha$] when the u vector is [1 0 1 1] in the second case Case_2, the x vector is [0 $\alpha^2$ 0 $\alpha$] when the u vector is [$\alpha$ 0 1 1] in the third case Case 3, and the x vector is [1 $\alpha^2$ 0 $\alpha$] when the u vector is [$\alpha^2$ 0 1 1] in the fourth case Case 4. As described above, in the first to fourth cases Case_1 to Case_4, in the relationship between the x vector and the u vector by the lower triangular kernel $G_{LTKN}$, it may be confirmed that the patterns of the values of the second through fourth input symbols $x_1$ to $x_3$ of the x vector are the same in the case Case_1 to Case4 when the values of the second to fourth output symbols $u_1$ to $u_3$ (i.e., other than the first output symbol $u_0$) are the same. As shown in FIG. 5B, in the case where the patterns of the values of the second through fourth output symbols u1 through u3 are the same, since the patterns of the values of the second to fourth input symbols $x_1$ to $x_3$ of the x-vector also appear the same, this point may serve as a basis for pre-computing the common terms. That is, a decoding method according to an embodiment of the present disclosure may generate the common terms associated with combinations of the input symbols (e.g., the second through fourth input symbols $x_1$ to $x_3$) other than the input symbol (e.g., the first input symbol $x_0$) corresponding to the target output symbol (e.g., the first output symbol $u_0$) in advance The generated common terms may be used to compute the LLRs of the destination output symbols (e.g., the first output symbol $u_0$).

Figure 6:
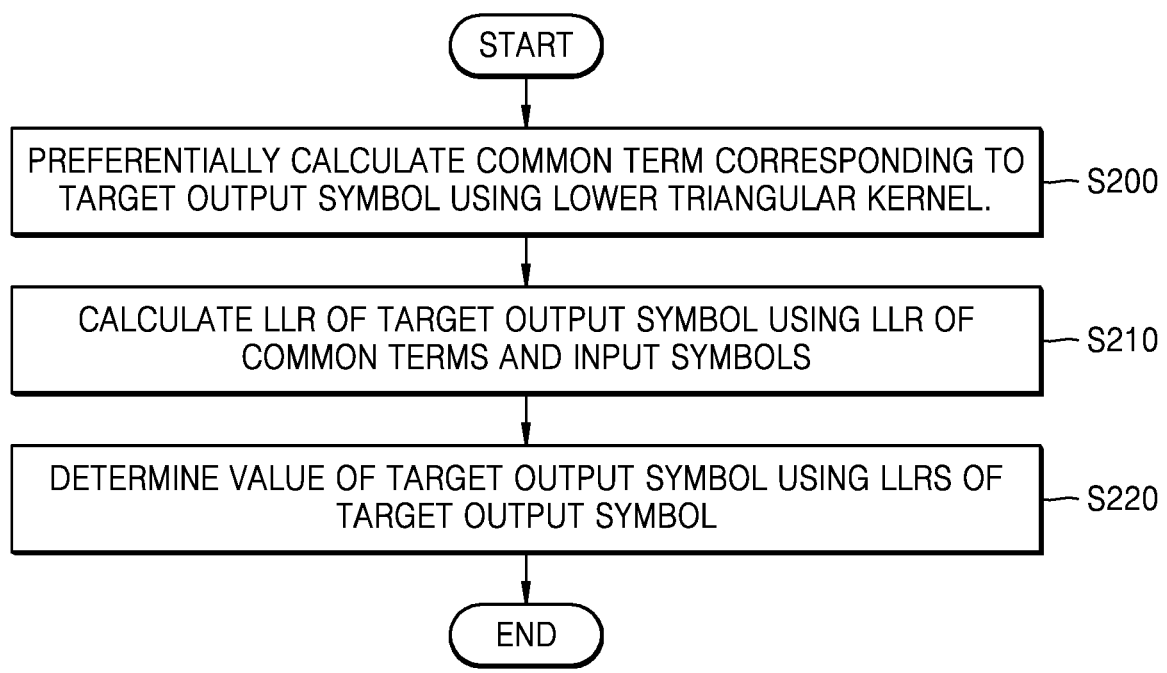
FIG. 6 is a diagram for explaining a decoding method of a low-complexity decoder of FIG. 1.

In addition, a relationship of $x_0 = u_0 + u_1 + \alpha^2 u_2 + u_3$, $x_1 = u_1 + \alpha u_2 + u_3$, and $x_2 = u_2 + u_3$. As an example, $x_0 = \alpha u_3{'}$ may be obtained through the lower triangular kernel $G_{LTKN}$. In summary, the lower triangular kernel $G_{LTKN}$ may be configured such that the second input symbol x1 does not depend on the first output symbol $u_0$, the third input symbol $x_2$ does not depend on the first output symbol $u_0$ and the second output symbol $u_1$, and the fourth input symbol $x_3$ does not depend on the first output symbol $u_0$ to the third output symbol $u_2$. That is, the value of the input symbols may be independent of output symbols FIG. 6 is a diagram for explaining a decoding method of the low-complexity decoder 100 of FIG. 1. Hereinafter, for the sake of explanation, description will be made with reference to FIG. 1.

Referring to FIG. 6, the low-complexity decoder 100 may generate LLRs for input symbols included in a non-binary polar code received by the reception apparatus 20 based on the channel characteristic(s) of the channel CH. The low-complexity decoder 100 may generate a lower triangular kernel through Gaussian elimination for the first kernel. In S200, the low-complexity decoder 100 may selectively (preferentially) calculate the common terms corresponding to the target output symbol using the lower triangular kernel. The common terms corresponding to the target output symbols may denote common terms that are pre-computed to determine the value of the target output symbol. Specifically, when the target output symbol has a predetermined value, the low-complexity decoder 100 may generate combinations of the remaining input symbols according to the value of the input symbol corresponding to the target output symbol, and the LLRs for the combinations may be calculated to generate common terms.

The low-complexity decoder 100 may store the generated common terms in a memory. In S210, the low-complexity decoder 100 may read the common terms from the memory and may calculate the LLRs of the target output symbols using the common terms and the LLRs of the input symbols. In S220, the low-complexity decoder 100 may determine the value of the target output symbol using the LLRs of the target output symbol.

Figure 7A:
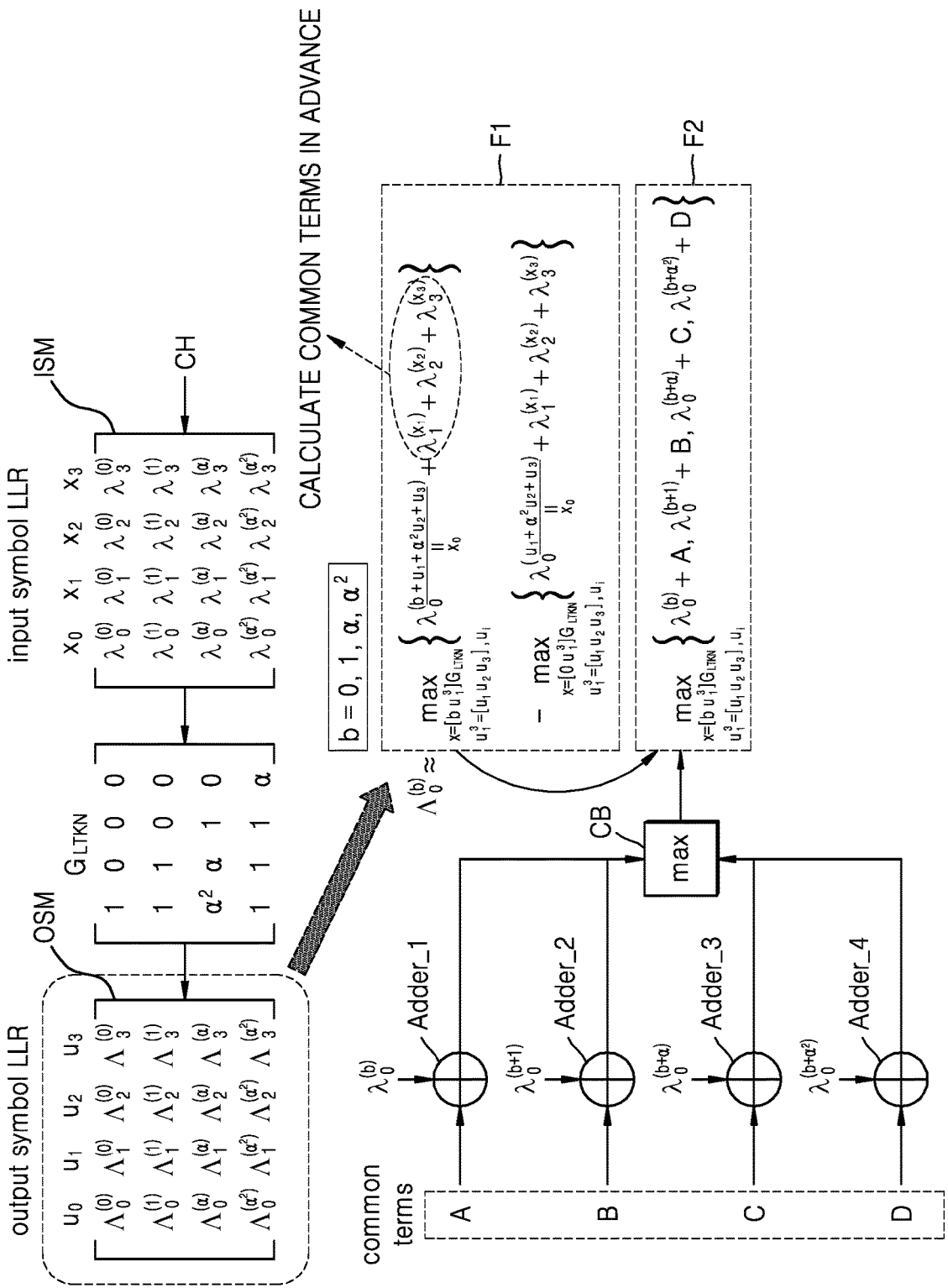
FIG. 7A is a diagram for specifically explaining a decoding method of a low-complexity decoder of FIG. 2.
Figures 7B, 8A:
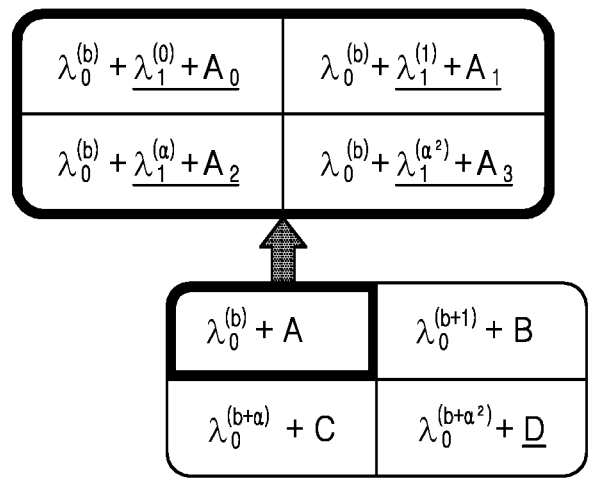
FIG. 7B is a table for specifically explaining the common terms generated by the decoding method of FIG. 7A.
FIG. 8A is a diagram for explaining an embodiment of a decoding method of low-complexity decoding of FIG. 2.

FIG. 7A is a diagram for explaining a decoding method of the low-complexity decoder 100 of FIG. 2 in detail, and FIG. 7B is a table TB1 for specifically describing common terms generated by the decoding method of FIG. 7A. Hereinafter, for better understanding, FIGS. 7A and 7B will be described with reference to FIG. 2. In addition, it may be assumed that the calculation of '$b+1$, $b+a$, $b+\alpha^2$' illustrated below is a Galois field-based calculation rather than a general arithmetic operation.

Referring to FIG. 7A, the LLR update module 120 may generate LLRs of the input symbols $x_0$ to $x_3$ included in the 4-ary polar code based on the channel characteristic(s) of the channel between the transmission apparatus and the reception apparatus. The LLRs of the input symbols $x_0$ to $x_3$ may be organized into a first matrix ISM. 'b' represents a value that each of the input symbols $x_0$ to $x_3$ and the output symbols u0 to u3 may have, and 'b' may correspond to any one value of '0', '1', '$\alpha$', and '$\alpha^2$'. For example, '$\lambda_0^{(0)}$' is a LLR indicating the probability that the first input symbol $x_0$ has a value of '0', '$\lambda_0^{(1)}$' is a LLR indicating the probability that the first input symbol $x_0$ has a value of '1', '$\lambda_0^{(\alpha)}$' is a LLR indicating the probability that the first input symbol $x_0$ has a value of '$\alpha$', and '$\lambda_0^{(\alpha 2)}$' is a LLR indicating the probability that the first input symbol x0 has a value of '$\alpha^2$'. In this way, the LLRs of the second to fourth input symbols $x_1$ to $x_3$ may be defined.

The LLR update module 120 may generate the LLRs of the output symbols $u_0$ to $u_3$ through operations using the lower triangular kernel $G_{LTKN}$ and the first matrix ISM. The LLRs of the output symbols $u_0$ to $u_3$ may be organized into a second matrix OSM. For example, '$\lambda_0^{(0)}$' is a LLR indicating the probability that the first output symbol $u_0$ may have a value of '0', '$\lambda_0^{(1)}$' is a LLR indicating the probability that the first output symbol $u_0$ may have a value of '1', '$\lambda_0^{(\alpha)}$' is a LLR indicating the probability that the first output symbol u0 may have a value of '$a$', and '$\lambda_0^{(\alpha 2)}$' is a LLR indicating the probability that the first output symbol $u_0$ may have a value of '$\alpha^2$'. In this way, the LLRs of the second to fourth output symbols u1 to u3 may be defined.

Specifically, the LLR update module 120 may perform an operation using the lower triangular kernel $G_{LTKN}$ and the first matrix ISM based on a first equation F1 to sequentially generate the LLRs of the output symbols $u_0$ to $u_3$. As an example, LLRs may be generated in the order of a first output symbol $u_0$, a second output symbol $u_1$, a third output symbol $u_2$, and a fourth output symbol $u_3$.

First, the LLR update module 120 may generate a LLR ($\lambda_0^{(b)}$) of the first output symbol $u_0$. In this case, when the first output symbol $u_0$ has a predetermined value, the common term computing module 125 may selectively generate combinations of the remaining input symbols $x_1$ to $x_3$ other than the first input symbol $x_0$ corresponding to the first output symbol $u_0$, that is, patterns composed of values that the remaining input symbols $x_1$ to $x_3$ may have. For example, the remaining input symbols $x_1$ to $x_3$ may have first combinations when the first input symbol $x_0$ has a value of '0', the remaining input symbols $x_1$ to $x_3$ may have second combinations when the first input symbol $x_0$ may have a value of '1', and the remaining input symbols $x_1$ to $x_3$ may have third combinations when the first input symbol $x_0$ has a value of '$a$', and the remaining input symbols $x_1$ to $x_3$ may have fourth combinations when the first input symbol $x_0$ has a value of $\alpha^2$. The common term computing module 125 may generate LLRs A, B, C, and D for the first to fourth combinations, respectively, using the first matrix ISM. The LLRs A, B, C, and D for the first to fourth combinations may be referred to as common terms. The common term computing module 125 may store the generated common terms A, B, C, and D in the memory 25.

The LLR update module 120 may generate LLRs ($\lambda_0^{(b)}$) of the first output symbol $u_0$ using the first matrix ISM and the common terms A, B, C, and D based on a second equation F2. Specifically, the LLR update module 120 may generate a sum value of an LLR ($\lambda_0^{(0)}$) and common term 'A' when the first input symbol $x_0$ is '0' when the first input symbol $x_0$ is '0', a sum value of an LLR ($\lambda_0^{(1)}$) and common term 'B' when the first input symbol $x_0$ is '1', a sum value of an LLR ($\lambda_0^{(\alpha)}$) and common term 'C' when the first input symbol $x_0$ is '$a$', and a sum value of an LLR ($\lambda_0^{(\alpha 2)}$) and common term 'D' when the first input symbol $x_0$ is '$\alpha^2$' using multiple adapters Adder_1 to Adder_4. The LLR update module 120 may determine the LLR ($\lambda_0^{(0)}$) when the first output symbol $u_0$ is '0' as the largest value of the sum values using the provided calculation block CB. In this manner, the LLR update module 120 may quickly obtain the remaining LLRs ($\lambda_0^{(1)}$, $\lambda_0^{(\alpha)}$, $\lambda_0^{(\alpha 2)}$) of the first output symbol $u_0$ using the common terms A, B, C and D, and detailed description thereof is omitted.

The LLR update module 120 may provide LLRs ($\lambda_0^{(0)}$, $\lambda_0^{(1)}$, $\lambda_0^{(\alpha)}$, $\lambda_0^{(\alpha 2)}$) of the generated first output symbol $u_0$ to the determination module 130, and the determination module 130 may determine that the first output symbol $u_0$ has a value corresponding to the largest LLR among the LLRs ($\lambda_0^{(0)}$, $\lambda_0^{(1)}$, $\lambda_0^{(\alpha)}$, $\lambda_0^{(\alpha 2)}$) of the first output symbol $u_0$.

Afterwards, the LLR update module 120 may generate the LLRs ($\lambda_1^{(b)}$) of the second output symbol $u_1$. In this case, the common term computing module 125 may selectively generate combinations of the remaining input symbols $x_2$ and $x_3$ other than the first input symbol $x_0$ corresponding to the second input symbol $x_1$ corresponding to the second output symbol $u_1$ and the first output symbol $u_0$ whose value is determined, that is, patterns composed of values that the remaining input symbols $x_2$ and $x_3$ may have. The common term computing module 125 may generate the LLRs for the combinations using the first matrix ISM, respectively. Afterwards, since operations of the common term computing module 125, the LLR update module 120 and the determination module 130 are similar to those in determining the value of the first output symbol $u_0$, detailed description thereof will be omitted.

Referring to FIG. 7B, as illustrated in a table TB1, when the target output symbol is the first output symbol $u_0$, the common term computing module 125 may generate an 'A' common term corresponding to the first input symbol $x_0$ when the first input symbol $x_0$ is a first value b, a 'B' common term corresponding to the first input symbol $x_0$ when the first input symbol $x_0$ is a second value b+1, a 'C' common term corresponding to the first input symbol $x_0$ when the first input symbol $x_0$ is a third value b+a, and a 'D' common term corresponding to the first input symbol $x_0$ when the first input symbol $x_0$ is a fourth value $b+\alpha^2$. In addition, when the target output symbol is the second output symbol $u_1$, the common term computing module 125 may generate an 'A' common term corresponding to the second input symbol $x_1$ when the second input symbol $x_1$ is a first value b, a 'B' common term corresponding to the second input symbol $x_1$ when the second input symbol $x_1$ is a second value b+1, a 'C' common term corresponding to the second input symbol when the second input symbol $x_1$ is a third value b+a, and a 'D' common term corresponding to the second input symbol $x_1$ when the second input symbol $x_1$ is a fourth value $b+\alpha^2$. In this manner, the common term computing module 125 may generate corresponding common terms when the target output symbol is either the third output symbol $u_2$ or the fourth output symbol $u_3$.

FIG. 8A is a diagram for explaining an embodiment of a decoding method of the low-complexity decoder 100 of FIG. 2, and FIG. 8B is a table TB2 for explaining common terms generated by the decoding method explained using the diagram of FIG. 8A. Hereinafter, for ease of understanding, FIGS. 8A and 8B will be described with reference to FIGS. 2 and 7A.

Referring to FIG. 8A, as described above, the common term computing module 125 may selectively calculate the common terms for the remaining input symbols other than the input symbol corresponding to the target output symbol and at least one additional input symbol. As an example, the common term computing module 125 may set an additional input symbol to the second input symbol $x_1$ when the LLRs ($\lambda_0^{(b)}$) of the first output symbol $u_0$ are generated and may generate combinations of the remaining input symbols $x_2$ and $x_3$ other than the first input symbol $x_0$ and the second input symbol $x_1$ to generate common terms by calculating the LLRs for the combinations.

Specifically, when the first output symbol $u_0$ has a predetermined value and the first input symbol $x_1$ has a predetermined value, the common term computing module 125 selectively generates combinations of the remaining input symbols $x_2$ and $x_3$ other than the first input symbol $x_0$ and the second input symbol $x_1$, that is, patterns composed of values that the remaining input symbols $x_2$ and $x_3$ may have. For example, the remaining input symbols $x_2$ and $x_3$ may have first combinations when the second input symbol $x_1$ has a value of '0', the remaining input symbols $x_2$ and $x_3$ may have second combinations when the second input symbol $x_1$ has a value of '1', the remaining input symbols $x_2$ and $x_3$ may have third combinations when the second input symbol $x_1$ has a value of 'a', and the remaining input symbols $x_2$ and $x_3$ may have fourth combinations when the second input symbol $x_1$ has a value of '$\alpha^2$'. The common term computing module 125 may generate the LLRs $A_0$, $A_1$, $A_2$, and $A_3$ for the first through fourth combinations using the first matrix ISM, respectively. The LLRs $A_0$, $A_1$, $A_2$, and $A_3$ for the first through fourth combinations may be referred to as common terms. The common term computing module 125 may store the generated common terms $A_0$, $A_1$, $A_2$, and $A_3$ in the memory 25.

Referring to FIG. 8B, as illustrated in a table TB2, when the target output symbol is the first output symbol $u_0$ and the first input symbol $x_0$ is a first value b, the common term computing module 125 may generate an '$A_0$' common term corresponding to the second input symbol $x_1$ when the second input symbol is a first value of 'b', an '$A_1$' common term corresponding to the second input symbol $x_1$ when the second input symbol is a first value of 'b+1', an '$A_2$' common term corresponding to the second input symbol $x_1$ when the second input symbol is a first value of 'b+a', and an '$A_3$' common term corresponding to the second input symbol $x_1$ when the second input symbol is a first value of '$b+\alpha^2$'.

In addition, when the target output symbol is a first output symbol $u_0$ and the first input symbol $x_0$ is a second value b+1, the common term computing module 125 may generate a '$B_0$' common term corresponding to the second input symbol $x_1$ when the second input symbol is a first value of 'b', a '$B_1$' common term corresponding to the second input symbol $x_1$ when the second input symbol is a first value of 'b+1', a '$B_2$' common term corresponding to the second input symbol $x_1$ when the second input symbol is a first value of 'b+a', and a '$B_3$' common term corresponding to the second input symbol $x_1$ when the second input symbol is a first value of '$b+\alpha^2$'. In this way, the common term computing module 125 may obtain the common terms when the second input symbol $x_1$ is the third value or the fourth value. Furthermore, the common term computing module 125 may generate the common terms corresponding to the target output symbol when the target output symbol is any one of the second to fourth output Symbol $u_1$ to $u_3$.

Figure 9:
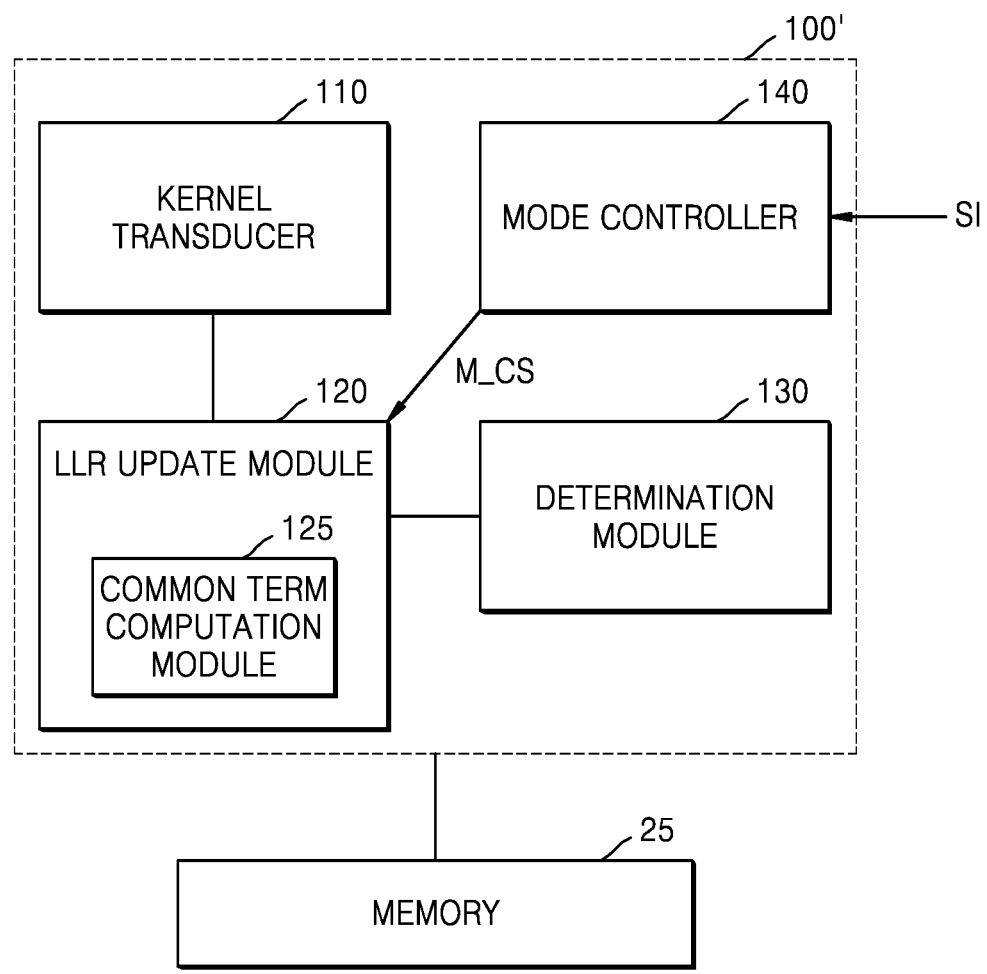
FIG. 9 is a block diagram illustrating another low-complexity decoder according to an embodiment of the present disclosure.

FIG. 9 is a block diagram illustrating another low-complexity decoder 100' according to an embodiment of the present disclosure.

The low-complexity decoder 100' may further include a mode controller 140. The other configurations are described in detail in FIG. 2, and the mode controller 140 will be mainly described. A mode controller 140 or any other controller described herein may be implemented with/as a logic circuit including a processor such as an application-specific integrated circuit (ASIC) or a microcontroller that execute instructions from a memory.

Referring to FIG. 9, the mode controller 140 may receive status information SI including various information such as performance information and operating environment for a reception apparatus including the low-complexity decoder 100'. The mode controller 140 may generate a mode control signal M_CS for adjusting the number of additional input symbols when the common terms are calculated on the common term computing module 125 based on the status information SI to provide the generated mode control signal M_CS to the LLR update module 120 or the common term computing module 125. For example, when complicated calculations are not quickly performed or when low latency is not required because the operation logic of the reception apparatus is simple, the mode controller 140 may provide a mode control signal M_CS to the LLR update module 120 to perform decoding in a first mode in which the LLR update module 120 may reduce only a certain degree of computational complexity. In addition, when complicated calculations are quickly performed or when low latency is required because the operation logic of the reception apparatus is complicated, the mode controller 140 may provide the mode control signal M_CS to the LLR update module 120 such that the LLR update module 120 performs decoding in a second mode that may lower a certain level of computational complexity. Therefore, the mode controller 140 may vary the level or degree of computational complexity dynamically based on operational requirements or device capabilities.

The common term computing module 125 may set the number of additional input symbols to a first number when the mode is a first mode based on the mode control signal M_CS and may set the number of additional input symbols to a second number when the mode is a second mode. The second number may be a value less than the first number.

Figure 10:
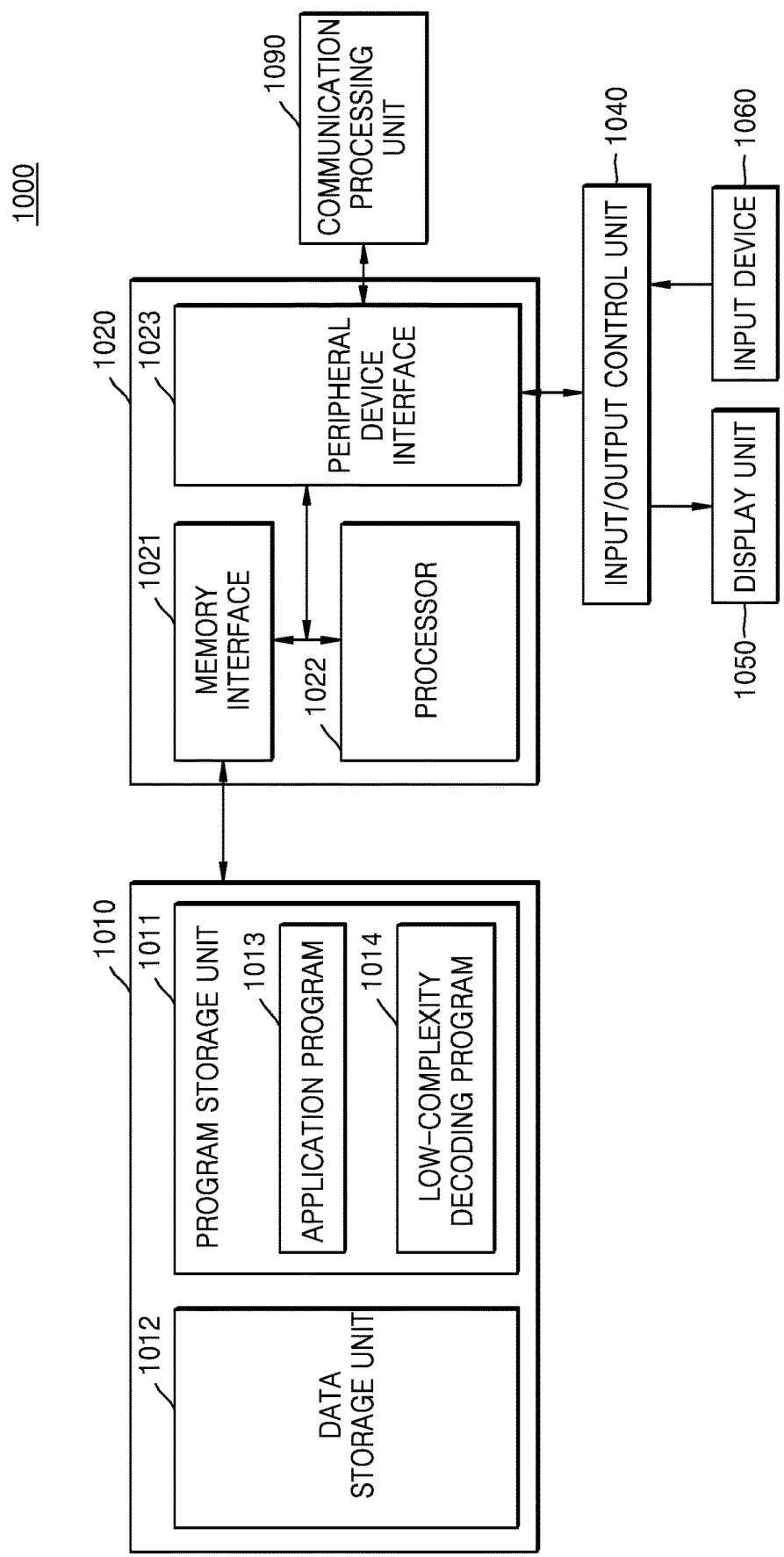
FIG. 10 is a block diagram illustrating an electronic device according to an embodiment of the present disclosure.

FIG. 10 is a block diagram illustrating an electronic device 1000 according to an embodiment of the present disclosure.

Referring to FIG. 10, the electronic device 1000 includes a memory 1010, a processor unit 1020, an input/output control unit 1040, a display unit 1050, an input device 1060, and a communication processing unit 1090. Here, multiple memories 1010 may exist. Respective components are as follows.

The memory 1010 may include a program storage unit 1011 that stores a program for controlling an operation of the electronic device and a data storage unit 1012 that stores data generated during program execution. The data storage unit 1012 may store data necessary for an operation of the application program 1013 and the low-complexity decoding program 1014. The program storage unit 1011 may include an application program 1013, a low-complexity decoding program 1014. Here, the program included in the program storage unit 1011 may be expressed as a set of instructions or an instruction set.

The application program 1013 may include an application program running on the electronic device. That is, application program 1013 may include instructions of an application driven by processor 1022. In a decoding method according to embodiments of the present disclosure, the low-complexity decoding program 1014 may control operations that are quickly available to generate LLRs of output symbols by precalculating common terms.

The peripheral device interface 1023 may control such that an input/output peripheral device of a base station is connected to a processor 1022 and a memory interface 1021. The processor 1022 may control the base station to provide the corresponding service using at least one software program. At this time, the processor 1022 may execute at least one program stored in the memory 1010 to provide a service corresponding to the program.

The input/output control unit 1040 may provide an interface between the peripheral device interface 1023 and an input/output device such as a display unit 1050 and an input device 1060. The display unit 1050 displays status information, characters to be input, a moving picture, and a still picture. For example, the display unit 1050 may display application program information driven by the processor 1022.

The input device 1060 may provide the input data generated by the selection of the electronic device to the processor unit 1020 through the input/output control unit 1040. At this time, the input device 1060 may include a keypad including at least one hardware button and a touchpad for sensing touch information. For example, the input device 1060 may provide touch information such as a touch, a touch movement, and a touch release sensed through the touch pad to the processor 1022 through the input/output control unit 1040.

The electronic device 1000 may include a communication processing unit 1090 that performs a communication function for voice communication and data communication. The communication processing unit 1090 may be capable of receiving a non-binary polar code. Such a non-binary polar code may be transmitted to the processor 1422 through the peripheral device interface 1023.

Figure 11:
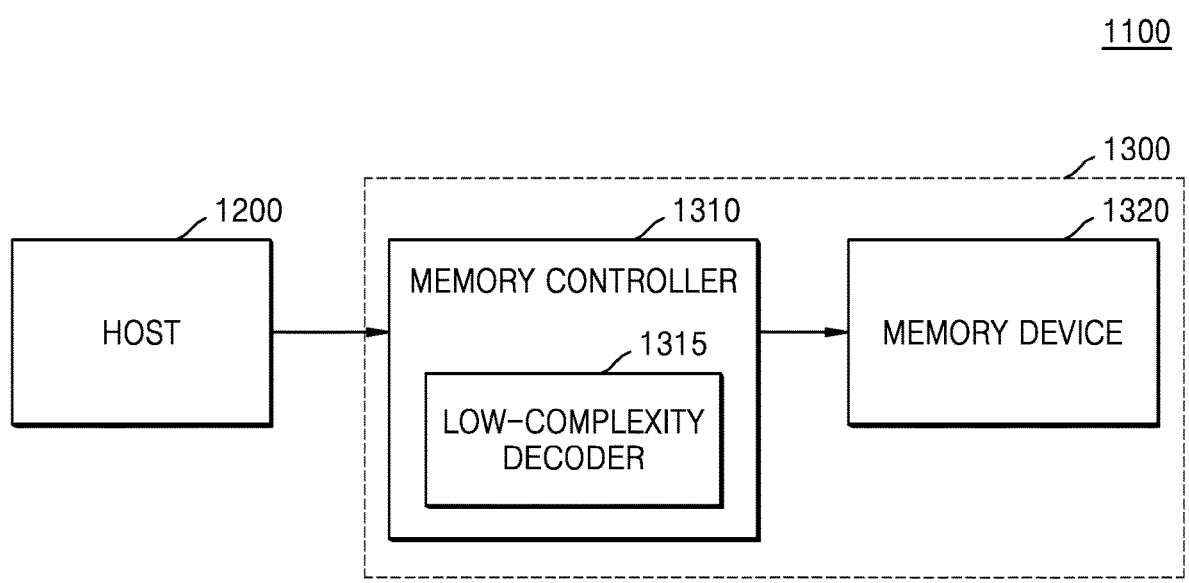
FIG. 11 is a block diagram illustrating a computing system according to an embodiment of the present disclosure.

FIG. 11 is a block diagram illustrating a computing system 1100 according to an embodiment of the present disclosure.

Referring to FIG. 11, a computing system 1100 may include a host 1200 and a memory system 1300. The memory system 1300 may include a memory controller 1310 and a memory device 1320. The memory controller 1310 may include a low-complexity decoder 1315 according to embodiments of the present disclosure. As noted previously, a memory controller 1310 or any other controller described herein may be implemented with a processor such as an ASIC or a microprocessor that executes instructions. The memory controller 1310 may receive signals in the form of non-binary polar code from the host 1200. The low-complexity decoder 1315 may perform decoding with non-binary polar code type signals in a decoding method according to embodiments of the present disclosure. The memory controller 1310 may use the decoding results to perform ECC or to perform memory operations with the memory device 1320.

As described above, example embodiments have been disclosed in the drawings and specification. Although the embodiments have been described herein with reference to specific terms, it should be understood that they have been used only for the purpose of describing the technical idea of the present disclosure and not for limiting the scope of the present disclosure as defined in the claims.

Therefore, those skilled in the art will appreciate that various modifications and equivalent embodiments are possible without departing from the scope of the present disclosure. Accordingly, the true scope of protection of the present disclosure should be determined by the technical idea of the appended claims.

While the present disclosure has been particularly shown and described with reference to embodiments thereof, it will be understood that various changes in form and details may be made therein without departing from the spirit and scope of the following claims.

What is claimed is:

1. An apparatus that receives a non-binary polar code through a channel, the apparatus comprising:
   a low-complexity decoder configured to implement a process that includes:
      selectively calculating, for input symbols in the non-binary polar code other than a first input symbol corresponding to a first target output symbol, first common terms using a lower triangular kernel and log likelihood ratios of the input symbols generated based on a channel characteristic of the channel,
      calculating log likelihood ratios of the first target output symbol using the first common terms; and determining a value of the first target output symbol based on the log likelihood ratios of the first target output symbol; and
a memory accessible by the low-complexity decoder and configured to store the first common terms as stored first common terms.

2. The apparatus of claim 1,
wherein the process implemented by the low-complexity decoder also includes:
selectively calculating, for input symbols in the non-binary polar code other than the first input symbol and a second input symbol corresponding to a second target output symbol, second common terms using the lower triangular kernel and the log likelihood ratios of the input symbols generated based on the channel characteristic of the channel;
calculating log likelihood ratios of the second target output symbol using the second common terms; and
determining a value of the second target output symbol based on the log likelihood ratios of the second target output symbol, and
wherein the memory is configured to store the second common terms as stored second common terms.

3. The apparatus of claim 2, wherein the lower triangular kernel is configured such that the second input symbol is not dependent on the first target output symbol.

4. The apparatus of claim 1, wherein the first common terms comprise values summed using the log likelihood ratios of the input symbols based on combinations of the input symbols other than the first input symbol when the first target output symbol has a predetermined value.

5. The apparatus of claim 1, wherein the process implemented by the low-complexity decoder also includes:
generating the log likelihood ratios of the first target output symbol by summing each component of the first common terms with each component of a plurality of log likelihood ratios of the first input symbol according to values available for the first target output symbol.

6. The apparatus of claim 1, wherein the low-complexity decoder is configured such that a value corresponding to a log likelihood ratio of the first target output symbol with a largest value among the log likelihood ratios of the first target output symbol is determined as a value of the first target output symbol.

7. The apparatus of claim 1, wherein the process implemented by the low-complexity decoder also includes:
generating the lower triangular kernel by performing Gaussian elimination for a first kernel used to generate the non-binary polar code.

8. The apparatus of claim 7, wherein the lower triangular kernel is configured such that terms below a diagonal of the lower triangular kernel comprise primitive elements and an exponent value of the lower triangular kernel is equal to an exponent value of the first kernel.

9. The apparatus of claim 1,
wherein the apparatus further comprises a processor, and
the process implemented by the low-complexity decoder also includes determining as determined values of target output symbols, from the input symbols and using the log likelihood ratios of the input symbols, values of target output symbols including the first target output symbol to provide the determined values of the target output symbols to the processor.

10. The apparatus of claim 1, wherein the memory is configured to delete the stored first common terms after the value of the first target output symbol is determined.

11. A decoding method of an apparatus that receives a non-binary polar code through a channel, the decoding method comprising:
generating, based on a channel characteristic of the channel, log likelihood ratios of input symbols in the non-binary polar code;
selectively calculating, for input symbols in the non-binary polar code other than a first input symbol corresponding to a first target output symbol, first common terms using a lower triangular kernel;
calculating log likelihood ratios of the first target output symbol using the first common terms; and
determining a value of the first target output symbol based on the log likelihood ratios of the first target output symbol.

12. The decoding method of claim 11,
wherein the apparatus comprises a memory, and
the decoding method further comprises storing the first common terms in the memory.

13. The decoding method of claim 11, wherein the decoding method further comprises:
selectively calculating a second input symbol corresponding to a second target output symbol, using the log likelihood ratios of the input symbols and the lower triangular kernel;
selectively calculating second common terms for input symbols in the non-binary polar code other than the first input symbol and the second input symbol;
calculating log likelihood ratios of the second target output symbol using the second common terms; and
determining a value of the second target output symbol based on the log likelihood ratios of the second target output symbol.

14. The decoding method of claim 11, further comprising:
generating the lower triangular kernel by performing Gaussian elimination for a first kernel used to generate the non-binary polar code.

15. The decoding method of claim 14, wherein the generating the lower triangular kernel further comprises:
configuring terms below a diagonal of the lower triangular kernel as primitive elements; and
transforming an exponent value of the first kernel to an exponent value of the lower triangular kernel.

16. The decoding method of claim 11, wherein calculating log likelihood ratios of the first target output symbol further comprises:
obtaining log likelihood ratios of the first input symbol according to values of the first target output symbol from the log likelihood ratios of the input symbols; and
generating log likelihood ratios of the first target output symbol by summing a component corresponding to each of the first common terms with a component of each of the log likelihood ratios of the first input symbol.

17. The decoding method of claim 11, wherein the determining a value of the first target output symbol further comprises determining a value corresponding to a log likelihood ratio with a largest value among the log likelihood ratios of the first target output symbol as the value of the first target output symbol.

18. The decoding method of claim 11, wherein selectively calculating the first common terms further comprises:
generating combinations of the input symbols in the non-binary polar code other than the first input symbol according to values of the first input symbol when the first target output symbol has a predetermined value; and generating the first common terms by calculating log likelihood ratios for the combinations of input symbols other than the first input symbol using the log likelihood ratios of the input symbols.

19. A decoding method of an apparatus that receives a non-binary polar code through a channel, the decoding method comprising:
- generating log likelihood ratios of input symbols in the non-binary polar code based on a channel characteristic of the channel;
- selectively calculating a first input symbol corresponding to a first target output symbol;
- selectively calculating, for input symbols in the non-binary polar code other than the first input symbol and a second input symbol corresponding to a second target output symbol to be decoded subsequent to the first target output symbol, common terms using a lower triangular kernel;
- calculating log likelihood ratios of the first target output symbol using the common terms; and
- determining a value of the first target output symbol based on the log likelihood ratios of the first target output symbol.

20. The decoding method of claim 19, wherein the selectively calculating the common terms further comprises:
- generating combinations of the input symbols other than the first input symbol according to values of the second input symbol when the first target output symbol has a predetermined value and the first input symbol has a predetermined value; and
- generating the common terms by calculating log likelihood ratios for the combinations of the input symbols other than the first input symbol using the log likelihood ratios of the input symbols other than the first input symbol.

* * * * *